(12) United States Patent
Alex et al.

(10) Patent No.: US 9,148,805 B2
(45) Date of Patent: Sep. 29, 2015

(54) SMALL CELL BASE STATION DTX MODE

(71) Applicant: Broadcom Corporation, Irvine, CA (US)

(72) Inventors: Sam Alex, Sunnyvale, CA (US); Louay Jalloul, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/274,328

(22) Filed: May 9, 2014

(65) Prior Publication Data

US 2014/0335845 A1 Nov. 13, 2014

Related U.S. Application Data

(60) Provisional application No. 61/822,090, filed on May 10, 2013.

(51) Int. Cl.
*H04M 3/00* (2006.01)
*H04W 24/02* (2009.01)
*H04W 76/04* (2009.01)
*H04W 16/32* (2009.01)

(52) U.S. Cl.
CPC ............. *H04W 24/02* (2013.01); *H04W 16/32* (2013.01); *H04W 76/048* (2013.01); *Y02B 60/50* (2013.01)

(58) Field of Classification Search
CPC ............ H04M 8/245; H04M 1/72525; H04M 1/72522
USPC ................................ 455/418, 422.1, 423, 446
See application file for complete search history.

(56) References Cited

U.S. PATENT DOCUMENTS

| | | | |
|---|---|---|---|
| 2010/0167778 A1* | 7/2010 | Raghothaman et al. | 455/522 |
| 2015/0018028 A1* | 1/2015 | Uplenchwar et al. | 455/522 |
| 2015/0085680 A1* | 3/2015 | Vrzic et al. | 370/252 |

* cited by examiner

*Primary Examiner* — Nghi H Ly
(74) *Attorney, Agent, or Firm* — Sterne, Kessler, Goldstein & Fox P.L.L.C.

(57) ABSTRACT

The present disclosure is directed to a system and method for transitioning small cell base stations out of a discontinuous transmission (DTX) mode. The system and method comprise monitoring at the small cell base stations uplink transmissions from user terminals (UTs) to a macrocell base station while the small cell base stations are in the DTX mode. The small cell base stations can use the monitored uplink transmissions to, for example, measure received power levels from the UTs and/or measure uplink path losses between the small cell base stations and the UTs. The small cell base stations can report these measured values back to the macrocell base station through a backhaul network. Based on these measurements, the macrocell base station can determine which small cell base stations can support which UTs without transitioning the small cell base stations out of the DTX mode.

20 Claims, 5 Drawing Sheets

SMALL CELL BASE STATION DTX MODE

CROSS REFERENCE TO RELATED APPLICATIONS

This application claims the benefit of U.S. Provisional Patent Application No. 61/822,090, filed May 10, 2013, which is incorporated by reference herein.

TECHNICAL FIELD

This application relates generally to small cell base stations in cellular networks.

BACKGROUND

A conventional cellular network is deployed as a homogenous network of macrocell base stations. The macrocell base stations may all have similar antenna patterns and similar high-level transmit powers. To accommodate increases in data traffic, more macrocell base stations can be deployed in a homogenous network, but such a solution is often unattractive due to increased inter-cell interference on the downlink and due to the high costs associated with site acquisition for newly deployed macrocell base stations.

Because of these drawbacks, cellular network operators are turning to heterogeneous networks to meet the demands of increased data traffic. In heterogeneous networks, small cell base stations are used to provide small coverage areas that overlap with the comparatively larger coverage areas provided by macrocell base stations. The small coverage areas are specifically provided in areas with high data traffic (or so called hotspots) to increase capacity. Examples of small cell base stations include, in order of decreasing coverage area, microcell base stations, picocell base stations, and femtocell base stations or home base stations.

One problem with heterogeneous networks is that the addition of small cell base stations can lead to the cellular network being overprovisioned in terms of data traffic capacity during times when traffic is low. For example, during certain periods of time, many of the deployed small cell base stations may actually be serving no traffic or such a little amount of traffic that a macrocell base station can handle the traffic while still meeting quality of service (QoS) requirements. In these instances, the small cell base stations are consuming power that could otherwise be conserved. Because power costs contribute to a large percentage of the overall operational costs of running a cellular network, it would be beneficial to turn-off the small cell base stations (or at least portions of the small cell base stations) when they have little or no traffic load. In addition, it would be beneficial to turn-off the small cell base stations (or at least portions of the small cell base stations) when they have little or no traffic load to reduce downlink interference caused by these devices.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

Figure 1:
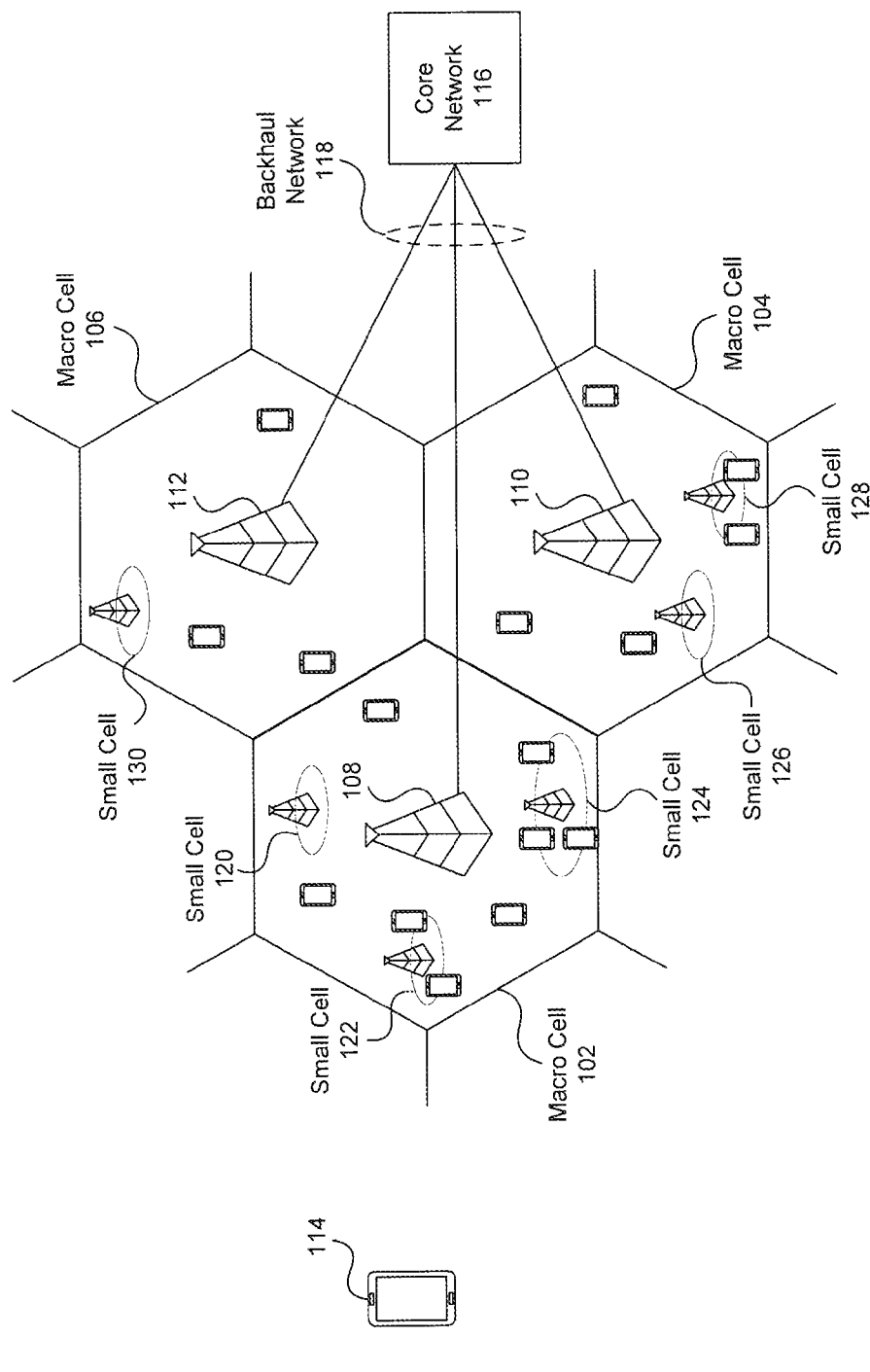
FIG. 1 illustrates an exemplary heterogeneous cellular network with small cell base stations that provide overlapping coverage with macrocell base stations in which embodiments of the present disclosure can be implemented.

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

I. OVERVIEW

To conserve power and reduce operational costs in a heterogeneous cellular network, small cell base stations that provide overlapping coverage with a macrocell base station can be turned-off when traffic loads permit. For example, much of the power used by a small cell base station is consumed by the small cell base station's transmitter used to transmit downlink to user terminals (UTs). At times when there is little or no data traffic being served by the small cell base station, the transmitter can be powered down or, in other words, the small cell base station can be placed in a discontinuous transmission (DTX) mode.

However, when the traffic load increases at the macrocell base station or at active small cell base stations, at least some of the small cell base stations that were placed in a DTX mode may need to transition out of the DTX mode to alleviate capacity issues. One way of determining which small cell base stations to transition out of the DTX mode is to turn-on all (or a large number) of the small cell base stations that are in the DTX mode so that the small cell base stations can transmit pilot signals. UTs in the range of one or more of the small cell base stations that are turned-on can perform channel measurements using the pilot signals transmitted by the small cell base stations and report the measurements back to the macrocell base station. Based on these measurements, the macrocell base station can determine which small cell base stations can support which UTs and, from there, select which UTs to handover to which small cell base stations to alleviate capacity issues. Small cell base stations that receive no UTs during this process can revert back to the DTX mode.

The above approach to transitioning small cell base stations out of the DTX mode can be inefficient because it can create significant interference or at least a significant change in interference when all (or a large number) of the small cell base stations are turned-on and it can require some small cell base stations to transition out of the DTX mode only to revert right back into the DTX mode. In addition, UTs with poor QoS may search for all small cell base stations under this approach, which can result in significant outage time and loss of power for those UTs.

The present disclosure is directed to a system and method for transitioning small cell base stations out of the DTX mode without these and other inefficiencies. In one embodiment, the system and method comprise monitoring, at the small cell base stations, uplink transmissions from UTs to a macrocell base station while the small cell base stations are in the DTX mode. The small cell base stations can use the monitored uplink transmissions to, for example, measure received power levels from the UTs and/or measure uplink path losses between the small cell base stations and the UTs. The small cell base stations can report these measured values back to the macrocell base station through a backhaul network. Based on these measurements, the macrocell base station can determine which small cell base stations can support which UTs without transitioning all (or a large number) the small cell base stations out of the DTX mode. From there, the macrocell base station can select which UTs to handover to which small cell base stations to alleviate capacity issues and transition those small cell base stations out of the DTX mode. Further aspects of the system and method of the present disclosure are described below.

II. EXEMPLARY OPERATING ENVIRONMENT

FIG. 1 illustrates an exemplary heterogeneous cellular network 100 in which embodiments of the present disclosure can be implemented. Heterogeneous cellular network 100 can be operated in accordance with any one of a number of different cellular network standards, including one of the current or yet to be released versions of the long-term evolution (LTE) standard and the worldwide interoperability for microwave access (WiMAX) standard.

As shown in FIG. 1, heterogeneous cellular network 100 is distributed over macrocells 102-106 that are each served by a respective macrocell base station 108-112. Macrocells 102-106 are geographically joined together to enable user terminals (UTs) 114 (e.g., mobile phones, laptops, tablets, pagers, smart watches, smart glasses, or any other device with an appropriate wireless modem) to wirelessly communicate over a wide area with a core network 116 via macrocell BSs 108-112. Macrocell BSs 108-112 are coupled to the core network by a backhaul network 118.

As further shown in FIG. 1, macrocells 102-106 are overlaid with several small cells 120-130 that are each served by a respective small cell base station. The small cell base stations are deployed in areas with high data traffic (or so called hotspots) to increase capacity. Although not shown, the small cell base stations are further coupled to the core network 116 by backhaul network 118.

Figure 2:
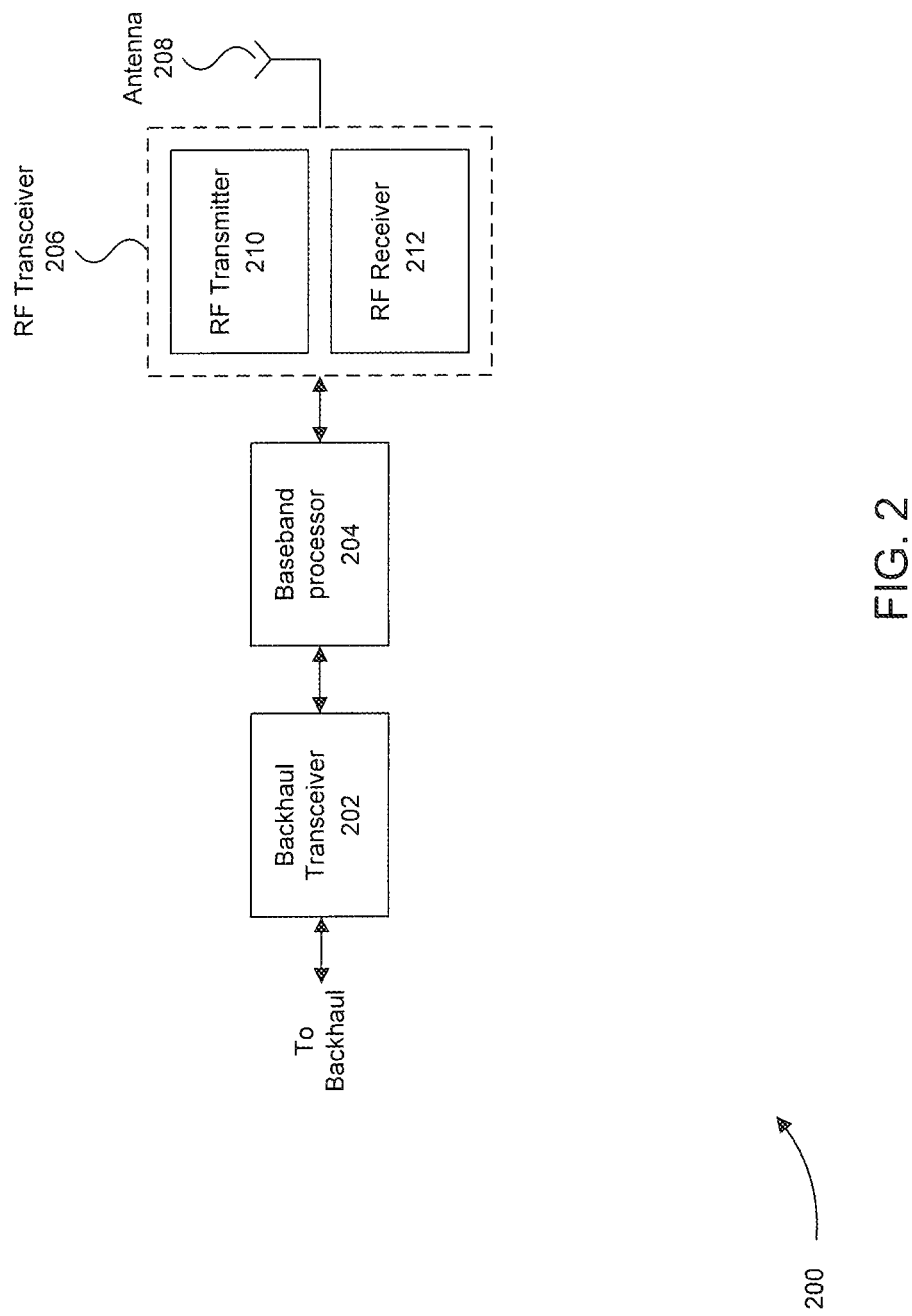
FIG. 2 illustrates an exemplary high-level block diagram of an implementation of a small cell base station in accordance with embodiments of the present disclosure.

Referring now to FIG. 2, an exemplary high-level block diagram 200 of an implementation for one or more of the small cell base stations in FIG. 1 is illustrated in accordance with embodiments of the present disclosure. As shown in block diagram 200, the small cell base station includes a backhaul transceiver 202, a baseband processor 204, an RF transceiver 206, and at least one antenna 208. RF transceiver 206 further includes an RF transmitter 210 and an RF receiver 212.

In operation, baseband processor 204 can be used to implement, at least in part, the radio protocol stack for one of several different cellular standards, including LTE and WiMAX, and can be used as an interface for passing data between backhaul transceiver 202 and RF transceiver 206. For example, data received over the backhaul network by backhaul transceiver 202 can be passed to baseband processor for formatting in accordance with a radio protocol stack, such as LTE. The formatted data can then be passed to RF transmitter 210 to perform, among other things, modulation of the formatted data onto a carrier, up-conversion of the carrier, amplification using a power amplifier, and transmission downlink to a UT served by the small cell base station using antenna 208.

Similarly, RF receiver 212 can receive an uplink signal from a UT served by the small cell base station using antenna 208 and can perform, among other things, amplification of the received signal using a low-noise amplifier, down-conversion of a carrier in the amplified signal, and demodulation of the down-converted carrier to recover data. The recovered data can be passed to baseband processor 204 to format the data in accordance with the radio protocol stack before passing the data on to backhaul transceiver 202 for transmission over the backhaul network. The baseband processor 204 can also transmit, receive, and process control messages with its corresponding macrocell base station as described herein.

III. SYSTEM AND METHOD FOR TRANSITIONING A SMALL CELL BASE STATION OUT OF A DTX MODE

Referring back to FIG. 1, to conserve power and reduce operational costs in heterogeneous cellular network 100, the small cell base stations that provide overlapping coverage with macrocell base stations 108-112 can be turned-off when traffic loads permit. For example, much of the power used by a small cell base station is consumed by the small cell base station's transmitter, such as RF transmitter 210 in FIG. 2, used to transmit downlink to UTs. At times when there is little or no data traffic being served by the small cell base station, the transmitter can be powered down or, in other words, the small cell base station can be placed in a discontinuous transmission (DTX) mode. The receiver used to receive uplink transmissions from UTs, such as RF receiver 212 in FIG. 2, may also be powered down while the small cell base station is in the DTX mode.

When the traffic load increases at the macrocell base station or even at other active small cell base stations, at least some of the small cell base stations that were placed in the DTX mode may need to transition out of the DTX mode to alleviate capacity issues so that QoS requirements can be met.

The present disclosure is directed to a system and method for transitioning small cell base stations out of the DTX mode in an efficient manner. Embodiments of the system and method can be explained using macrocell base station 108 and the small cell base stations of small cells 120-124 that overlay the coverage area provided by macrocell base station 108. In this exemplary context, to transition one or more of the small cell base stations of small cells 120-124 out of a DTX mode, macrocell base station 108 can begin by transmitting a message to the small cell base stations via backhaul network 118 to monitor uplink transmissions to macrocell base station 108 from UTs inside the respective sensing ranges of the small cell base stations.

Upon receiving the message, the baseband processors of the small cell base stations, such as baseband processor 204 in FIG. 2, may need to first power-up the receivers of the small cell base stations used to receive uplink transmissions from UTs. After the receivers of the small cell base stations are powered up, the small cell base stations can begin to monitor uplink transmissions to macrocell base station 108 while remaining in the DTX mode.

The small cell base stations can use the monitored uplink transmissions to measure received power levels from the UTs. For example, the baseband processors of the small cell base stations can measure received power levels for the monitored uplink transmissions. The small cell base stations can then report the measured received power levels to macrocell base station 108 via backhaul network 118 using their backhaul transceivers, such as backhaul transceiver 202 in FIG. 2. Macrocell base station 108 can use the measured received power levels to determine whether an uplink transmission for a particular UT was received with adequate power at the small cell base station to support at least the same level of QoS that macrocell base station 108 is providing to the UT in the uplink direction in the event that the UT is handed over to the small cell base station. Macrocell base station 108 can make this determination by comparing the measured received power reported by the small cell base station to the received power it measures for the same uplink transmission. In another embodiment, Macrocell base station 108 can use the measured received power levels to determine whether an uplink transmission for a particular UT was received with adequate power at the small cell base station to support a required or minimum QoS in the uplink direction in the event that the UT is handed over to the small cell base station.

In one embodiment, the small cell base stations only measure the received powers (or report the measured received powers) for uplink transmissions that the small cell base stations are able to properly recover data from. Verification of proper recovery can be performed, for example, using a cyclic redundancy check included in the uplink transmissions. In order to attempt to recover the data transmitted uplink by the UTs to macrocell base station 108, the small cell base stations can further receive from macrocell base station 108 one or more of the upstream allocations for the UTs (e.g., the uplink time/frequency resource blocks assigned to each UT), identifying information of the UTs (such as an assigned ID number), and the code rate and modulation order the UTs are expected to use to transmit data uplink. The small cell base station can receive this information from macrocell base station 108 over backhaul network 118 or by sniffing downlink transmissions from macrocell base station 108 to the UTs that contain this information.

The small cell base stations can further use the monitored uplink transmissions to measure the uplink path loss from the UTs to the small cell base stations. For example, the baseband processors of the small cell base stations can use the received pilot tones in the uplink transmissions and the known transmitted values of those pilot tones to measure the uplink path loss from the UTs to the small cell base stations. The small cell base stations can then report the measured uplink path losses to macrocell base station 108 via backhaul network 118. Macrocell base station 108 can use the measured uplink path losses to determine whether the small cell base station can support at least the same QoS that macrocell base station 108 is providing to a UT in the downlink direction in the event that the UT is handed over to the small cell base station. In another embodiment, Macrocell base station 108 can use the measured uplink path losses to determine whether the small cell base station can support a required QoS or minimum QoS in the downlink direction in the event that the UT is handed over to the small cell base station.

For example, macrocell base station 108 can use the uplink path loss measured for an uplink transmission from a UT to estimate the downlink path loss (given that the two path losses are typically similar) between the small cell base station and the UT. Then, using the estimated downlink path loss and a transmit power associated with the small cell base station, macrocell base station 108 can determine whether the small cell base station can support at least the same QoS that macrocell base station 108 is providing to a UT. In another embodiment, Macrocell base station 108 can use the estimated downlink path loss and a transmit power associated with the small cell base station to determine whether the small cell base station can support a required QoS or minimum QoS in the downlink direction in the event that the UT is handed over to the small cell base station.

As explained above, macrocell base station 108 can determine from the information reported by the small cell base stations which small cell base stations can support which UTs with adequate QoS in both the uplink and downlink directions without transitioning the small cell base stations out of the DTX mode. Based on this knowledge, macrocell base station 108 can select which UTs to handover to which small cell base stations to alleviate capacity issues and transition those small cell base stations out of the DTX mode. To transition a small cell base station out of the DTX mode, macrocell base station 108 can send a message to the small cell base station to exit the DTX mode. The message can be sent over the backhaul network or even over a downlink channel.

In one embodiment, once a small cell base station is instructed to exit the DTX mode, the small cell base station can power-up its transmitter, such as RF transmitter 210 in FIG. 2.

In a further embodiment, UTs can be instructed by macrocell base station 108 to scan only for those small cell base stations that can support adequate QoS in the uplink and downlink directions to the UTs.

Figure 3:
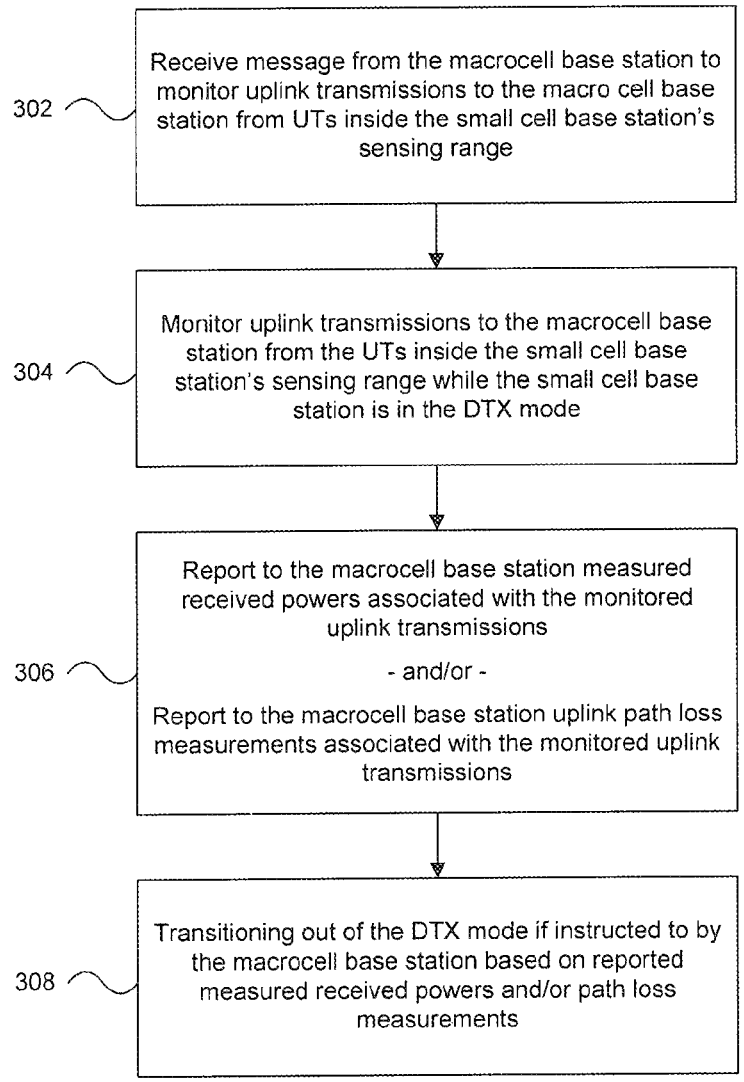
FIG. 3 illustrates a flowchart of a method for a small cell base station to transition out of the DTX mode in accordance with embodiments of the present disclosure.

Referring now to FIG. 3, a flowchart 300 of a method for a small cell base station to transition out of a DTX mode in accordance with embodiments of the present disclosure is illustrated. The method of flowchart 300 can be implemented by a small cell base station configured as shown in FIG. 2. However, it should be noted that the method can be implemented by other small cell base stations with different configurations.

The method of flowchart 300 begins at step 302. At step 302, the small cell base station receives a message over a backhaul network from the macrocell base station that it provides overlapping coverage with. The small cell base station can use backhaul transceiver 202 in FIG. 2, for example, to receive the message. The message instructs the small cell base station to monitor uplink transmissions to the macrocell base station from UTs inside the small cell base station's sensing range.

At step 304, the small cell base station monitors uplink transmissions to the macrocell base station from the UTs inside the small cell base station's sensing range while the small cell base station is in the DTX mode. The small cell base station can use RF receiver 212 in FIG. 2, for example, to monitor the uplink transmissions.

At step 306, the small cell base station measures the received powers associated with those monitored uplink transmissions and reports those measured received powers to the macrocell base station via the backhaul network. The small cell base station can use baseband processor 204 in FIG. 2, for example, to measure the received powers. In one embodiment, the small cell base station reports to the macrocell base station only the received powers associated with those monitored uplink transmissions that the small cell base station is able to recover data from as explained above.

In addition to measuring and reporting the received powers, at step 306 the small cell base station can further measure the uplink path loss associated with the monitored uplink transmissions using, for example, pilot tones transmitted by the UTs in the uplink transmissions. Once measured, the small cell base station can report the measured uplink path losses to the macrocell base station via the backhaul network.

At step 308, the small cell base station transitions out of the DTX mode if instructed to by the macrocell base station based on the reported measured received power and/or path loss measurements.

Figure 4:
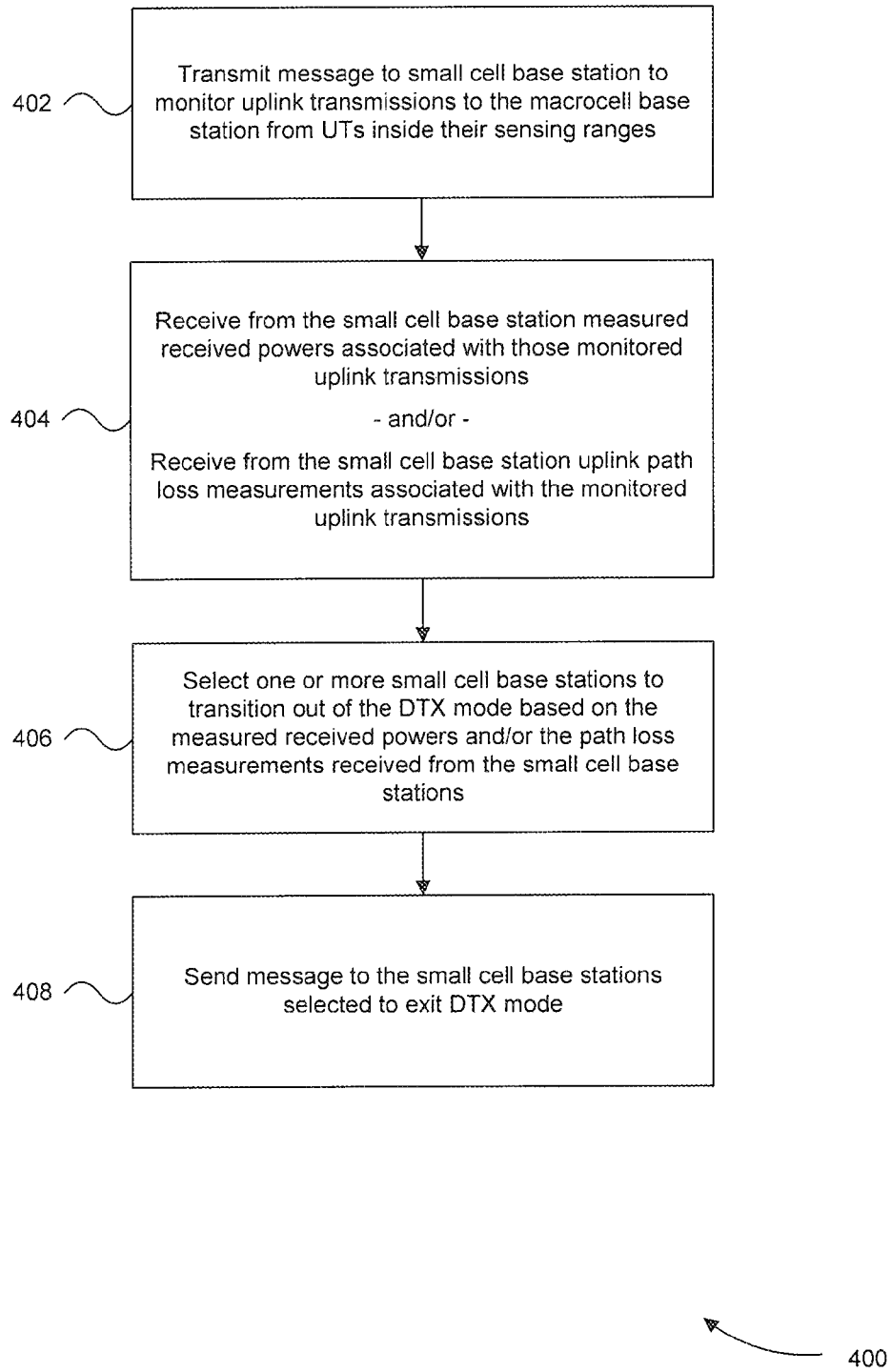
FIG. 4 illustrates a flowchart of a method for a macrocell base station to determine which small cell base stations to instruct to transition out of the DTX mode in accordance with embodiments of the present disclosure.

Referring now to FIG. 4, a flowchart 400 of a method for a macrocell base station to determine which small cell base stations to instruct to transition out of the DTX mode in accordance with embodiments of the present disclosure is illustrated. The macrocell base station can have the same or a similar configuration as that of the small cell base station shown in FIG. 2.

The method of flowchart 400 begins at step 402. At step 402, the macrocell base station transmits a message to the small cell base stations in a DTX mode to monitor uplink transmissions to the macrocell base station from UTs inside their sensing ranges.

At step 404, the macrocell base station receives over the backhaul network from the small cell base stations measured received powers associated with the monitored uplink transmissions. In one embodiment, the macrocell base station only receives the measured received powers associated with those monitored uplink transmissions that the small cell base stations are able to successfully decode and verify the data from as explained above.

In addition to receiving over the backhaul network from the small cell base stations measured received powers associated with the monitored uplink transmissions, at step 404 the macrocell base station can receive over the backhaul network from the small cell base stations measured uplink path losses associated with the uplink transmissions.

At step 406, the macrocell base station can determine from the information reported by the small cell base stations which small cell base stations can support which UTs with adequate QoS in both the uplink and downlink directions as explained above. From there, the macrocell base station can select which UTs to handover to which small cell base stations to alleviate capacity issues and, thereby, select those small cell base stations to transition out of the DIX mode.

At step 408, the macrocell base station can send a message to the small cell base stations selected at step 406 to transition out of the DTX mode. The message can be sent over the backhaul network or even over a downlink channel.

IV. EXAMPLE COMPUTER SYSTEM ENVIRONMENT

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 5:
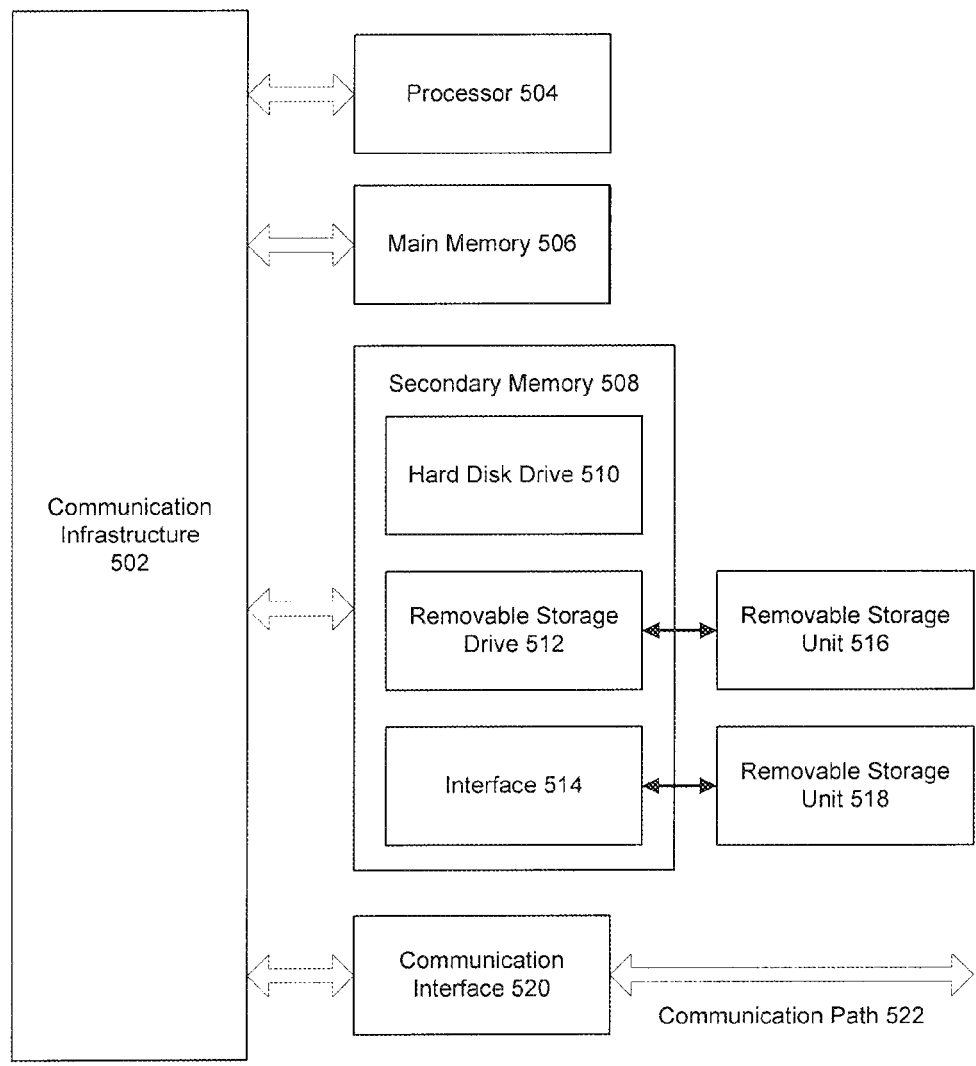
FIG. 5 illustrates a block diagram of an example computer system that can be used to implement aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 500 is shown in FIG. 5. Modules depicted in FIG. 2 may execute on one or more computer systems 500. Furthermore, each of the steps of the flowchart depicted in FIGS. 3 and 4 can be implemented on one or more computer systems 500.

Computer system 500 includes one or more processors, such as processor 504. Processor 504 can be a special purpose or a general purpose digital signal processor. Processor 504 is connected to a communication infrastructure 502 (for example, a bus or network). Various software implementations are described in terms of this exemplary computer system. After reading this description, it will become apparent to a person skilled in the relevant art(s) how to implement the disclosure using other computer systems and/or computer architectures.

Computer system 500 also includes a main memory 506, preferably random access memory (RAM), and may also include a secondary memory 508. Secondary memory 508 may include, for example, a hard disk drive 510 and/or a removable storage drive 512, representing a floppy disk drive, a magnetic tape drive, an optical disk drive, or the like. Removable storage drive 512 reads from and/or writes to a removable storage unit 516 in a well-known manner. Removable storage unit 516 represents a floppy disk, magnetic tape, optical disk, or the like, which is read by and written to by removable storage drive 512. As will be appreciated by persons skilled in the relevant art(s), removable storage unit 516 includes a computer usable storage medium having stored therein computer software and/or data.

In alternative implementations, secondary memory 508 may include other similar means for allowing computer programs or other instructions to be loaded into computer system 500. Such means may include, for example, a removable storage unit 518 and an interface 514. Examples of such means may include a program cartridge and cartridge interface (such as that found in video game devices), a removable memory chip (such as an EPROM, or PROM) and associated socket, a thumb drive and USB port, and other removable storage units 518 and interfaces 514 which allow software and data to be transferred from removable storage unit 518 to computer system 500.

Computer system 500 may also include a communications interface 520. Communications interface 520 allows software and data to be transferred between computer system 500 and external devices. Examples of communications interface 520 may include a modem, a network interface (such as an Ethernet card), a communications port, a PCMCIA slot and card, etc. Software and data transferred via communications interface 520 are in the form of signals which may be electronic, electromagnetic, optical, or other signals capable of being received by communications interface 520. These signals are provided to communications interface 520 via a communications path 522. Communications path 522 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 516 and 518 or a hard disk installed in hard disk drive 510. These computer program products are means for providing software to computer system 500.

Computer programs (also called computer control logic) are stored in main memory 506 and/or secondary memory 508. Computer programs may also be received via communications interface 520. Such computer programs, when executed, enable the computer system 500 to implement the present disclosure as discussed herein. In particular, the computer programs, when executed, enable processor 504 to implement the processes of the present disclosure, such as any of the methods described herein. Accordingly, such computer programs represent controllers of the computer system 500. Where the disclosure is implemented using software, the software may be stored in a computer program product and loaded into computer system 500 using removable storage drive 512, interface 514, or communications interface 520.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

IV. CONCLUSION

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A method for transitioning a small cell base station out of a discontinuous transmission (DTX) mode, the method comprising:
   receiving a message from a macrocell base station to monitor an uplink transmission to the macrocell base station from a user terminal (UT);
   in response to receiving the message, monitoring at the small cell base station the uplink transmission while the small cell base station is in the DTX mode;
   reporting, to the macrocell base station, a measured received power associated with the uplink transmission and an uplink path loss measurement associated with the uplink transmission; and
   transitioning the small cell base station out of the DTX mode if instructed to by the macrocell base station based on the reported measured received power associated with the uplink transmission and the reported uplink path loss measurement associated with the uplink transmission.

2. The method of claim 1, wherein the message is received from the macrocell base station based on a traffic load condition at the macrocell.

3. The method of claim 1, wherein the message is received from the macrocell base station if the macrocell base station is unable to handle a traffic load at a required quality of service level.

4. The method of claim 1, further comprising:
   receiving from the macrocell base station a UT identification, an uplink resource allocation, a code rate, and a modulation scheme to be used by the UT to transmit the uplink transmission.

5. The method of claim 4, wherein the UT identification, the uplink resource allocation, the code rate, and the modulation scheme are received from the macrocell base station over a backhaul network.

6. The method of claim 4, wherein the UT identification, the uplink resource allocation, the code rate, and the modulation scheme are received from the macrocell base station via a downlink transmission to the UT.

7. The method of claim 4, further comprising:
   decoding the uplink transmission using the uplink resource allocation, the code rate, and the modulation scheme to verify that the small cell base station is able to properly decode the uplink transmission.

8. The method of claim 1, wherein the measured received power associated with the uplink transmission is determined based on pilot signals sent by the UT in the uplink transmission.

9. The method of claim 1, wherein the macrocell base station uses the reported measured received power associated with the uplink transmission to determine whether the small cell base station is able to support a quality of service level in the uplink direction from the UT to the small cell base station.

10. The method of claim 1, wherein the macrocell base station uses the reported uplink path loss measurement associated with the uplink transmission to determine whether the small cell base station is able to support a quality of service level in the downlink direction from the small cell base station to the UT.

11. A small cell base station, comprising:
    a backhaul transceiver configured to receive a message from a macrocell base station to monitor an uplink transmission to the macrocell base station from a user terminal (UT);
    a receiver configured to monitor the uplink transmission to the macrocell base station from the UT in response to receiving the message while the small cell base station is in a discontinuous transmission (DTX) mode; and
    a baseband processor configured to report to the macrocell base station a measured received power associated with the uplink transmission and an uplink path loss measurement associated with the uplink transmission.

12. The small cell base station of claim 11, wherein the baseband processor is further configured to transition the small cell base station out of the DTX mode if instructed to by the macrocell base station based on the reported measured received power associated with the uplink transmission and the reported uplink path loss measurement associated with the uplink transmission.

13. The small cell base station of claim 11, further comprising:
    a transmitter configured to transmit downlink to the UT, wherein the baseband processor is further configured to transition the small cell base station out of the DTX mode by powering up the transmitter.

14. The small cell base station of claim 11, wherein the receiver is powered down prior to receiving the message from the macrocell base station.

15. The small cell base station of claim 11, wherein the message is received from the macrocell base station based on a traffic load.

16. The small cell base station of claim 11, wherein the message further comprises a UT identification, an uplink resource allocation, a code rate, and a modulation scheme to be used by the UT to transmit the uplink transmission.

17. The small cell base station of claim 11, wherein the receiver is further configured to receive from the macrocell base station via a downlink transmission to the UT a UT identification, an uplink resource allocation, a code rate, and a modulation scheme to be used by the UT to transmit the uplink transmission.

18. A method for transitioning a small cell base station out of a discontinuous transmission (DTX) mode, the method comprising:

receiving a message from a macrocell base station to monitor an uplink transmission to the macrocell base station from a user terminal (UT);

in response to receiving the message, monitoring, at the small cell base station, the uplink transmission to the macrocell base station from the UT while the small cell base station is in the DTX mode;

reporting, to the macrocell base station, a measured received power associated with the uplink transmission if the small cell base station properly decodes the uplink transmission; and transitioning the small cell base station out of the DTX mode if instructed to by the macrocell base station based on the reported measured received power associated with the uplink transmission.

19. The method of claim 18, wherein the message is received from the macrocell base station based on a traffic load.

20. The method of claim 18, wherein the macrocell base station uses the reported measured received power associated with the uplink transmission to determine whether the small cell base station is able to support a quality of service level in the uplink direction from the UT to the small cell base station.

* * * * *